UNITED STATES PATENT OFFICE.

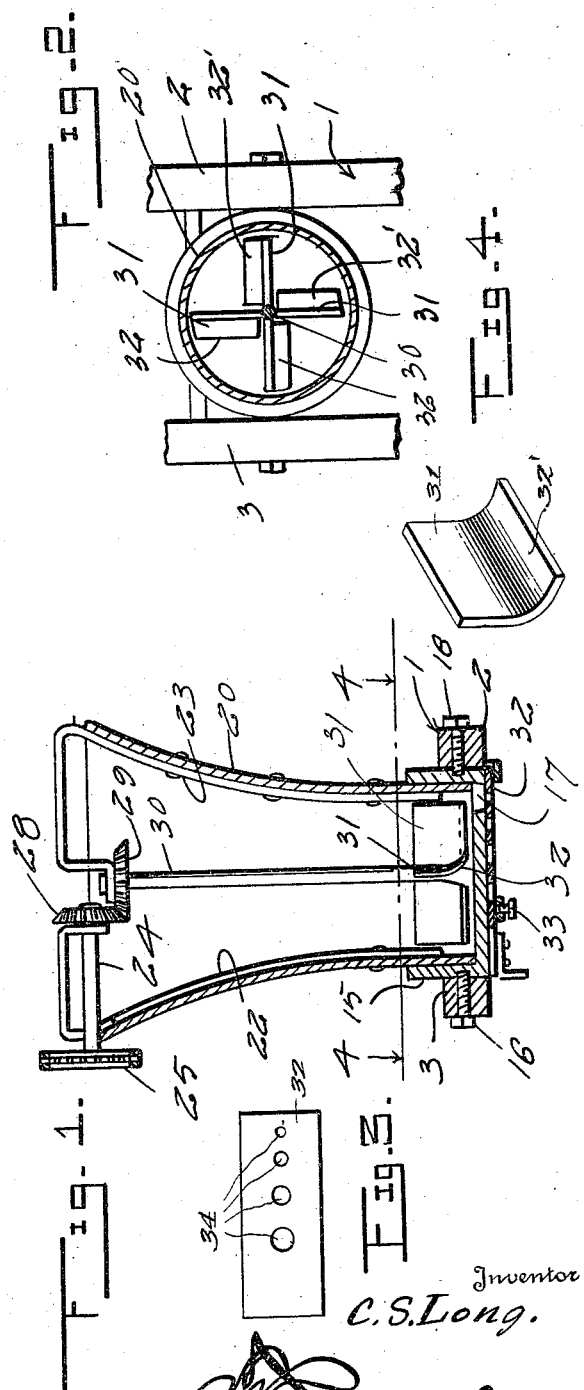

CHARLES S. LONG, OF TOLEDO, OHIO.

PLANTER.

1,296,540.   Specification of Letters Patent.   Patented Mar. 4, 1919.

Application filed November 14, 1917. Serial No. 201,988.

*To all whom it may concern:*

Be it known that I, CHARLES S. LONG, a citizen of the United States, residing at Toledo, in the county of Lucas and State of Ohio, have invented certain new and useful Improvements in Planters; and I do hereby declare the following to be a full, clear, and exact description of the invention, such as will enable others skilled in the art to which it appertains to make and use the same.

This invention relates to planters of the drill type and the primary object of the invention is to provide a drill or planter which may be manually propelled, for planting various types of seeds, such as onion seeds, lettuce, celery, peas, beans, corn or the like preferably for truck farming.

Another object of the invention is to provide a planter as specified which includes a supporting frame having hopper detachably carried thereby in which is positioned an agitator operated by the rotation of one of the wheels of the planter for agitating the grain or seed so that it will pass out of the delivering opening in the bottom of the hopper, through the seed plate and into the usual form of delivering spout for deposit in the furrow formed by the furrow opening shoe and further to provide an agitator which has a plurality of radially extending blades the lower edges of which are curved for forcing the seed downward toward the bottom of the hopper.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:

Figure 1 is a section on the line 3—3 of Fig. 2,

Fig. 2 is a section on the line 4—4 of Fig. 3,

Fig. 3 is a plan view of a seed dispensing plate used in connection with the planter, Fig. 4 is a detail perspective view of one of the plates of the agitator.

Referring more particularly to the drawings, 1 indicates the main supporting frame of the planter, which is composed of a pair of side rails 2 and 3.

The supporting frame 1 has a hopper base 15 attached thereto intermediate of its ends in any suitable manner, preferably by set screws 16 as illustrated in Fig. 1 of the drawing. The base 15 may be constructed of cast iron or analogous metal and it has a dispensing opening 17 formed therein which communicates with a delivery spout. The spout has the usual type of furrow shoe carried by its lower end which opens the furrow into which the seed is deposited from the spout.

A sheet metal hopper 20 is carried by the hopper base 15 and any suitable type of locking means may be provided for connecting the hoppers 20 to the hopper base 15. The hopper 20 has a pair of bearing arms 22 and 23 attached thereto. The arm 22 has its upper end bent to form a pair of bearings which rotatably support the shaft 24. The shaft 24 has a sprocket 25 mounted thereon about which a chain travels. The chain also travels about a sprocket which is carried by a front axle mounted on the rails 2 and 3 so that the shaft 24 will be rotated by the rotation of the axle. A beveled gear 28 is mounted upon the shaft 24 and meshes with the beveled gear 29 which is mounted upon a vertical shaft 30. The vertical shaft 30 is supported by bearings formed upon the arm 23 as clearly shown in Fig. 1 of the drawings. The shaft 30 extends downwardly centrally within the hopper 20 and it has a plurality of radiated blades 31 carried by its lower ends. The blades 31 have their lower ends curved, as clearly shown at 32', so that during the rotation of the shaft 30 the curved edges of the blades 31 will agitate the seed within the hopper while the lower curved edges 32' will have the tendency to drive the seed downwardly toward the bottom of the hopper so that it will pass freely through the outlet opening 17.

A seed plate 32 is adjustably carried beneath the hopper bottom 15 and it is held in adjusted position by means of a set screw 33. The plate 32 is provided with a plurality of spaced openings 34 which are of different diameter and are provided for properly sowing seed of different type.

In reducing the invention to practice, certain minor features of construction, combination and arrangement of parts may necessitate alterations to which applicant is entitled provided such alterations are comprehended within the scope of what is claimed.

What is claimed is:

In a planter structure, a supporting frame, a hopper bottom carried by said supporting frame and having a dispensing opening therein, a hopper carried by said hopper bottom, a bearing bracket carried by said hopper, a vertical shaft supported by said bracket and extending downwardly within said hopper, a plurality of radiating blades mounted upon the lower end of said vertical shaft and having their lower edges curved for guiding seed downwardly toward the bottom of the hopper, means for rotating said shaft, a seed plate provided with a plurality of openings of different diameter slidably positioned beneath the hopper bottom, a set screw for holding the seed plate in adjusted position for regulating the opening which alines with the opening of said hopper bottom.

In testimony whereof I affix my signature in presence of two witnesses.

CHARLES S. LONG.

Witnesses:
 SOL D. TUCKER,
 LEAH GUYMAN.

Copies of this patent may be obtained for five cents each, by addressing the "Commissioner of Patents, Washington, D. C."